United States Patent
Lee

(10) Patent No.: US 10,250,067 B2
(45) Date of Patent: Apr. 2, 2019

(54) METHOD FOR PERFORMING WIRELESS CHARGING CONTROL OF AN ELECTRONIC DEVICE WITH AID OF RANDOM PHASE-DELAY PACKET, AND ASSOCIATED APPARATUS

(71) Applicant: MediaTek Inc., Hsin-Chu (TW)

(72) Inventor: Chi-Min Lee, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 15/870,682

(22) Filed: Jan. 12, 2018

(65) Prior Publication Data

US 2018/0138733 A1     May 17, 2018

Related U.S. Application Data

(62) Division of application No. 14/307,501, filed on Jun. 18, 2014, now Pat. No. 9,906,063.

(Continued)

(51) Int. Cl.
*H02J 7/00*         (2006.01)
*H02J 7/02*         (2016.01)
(Continued)

(52) U.S. Cl.
CPC ............. *H02J 7/025* (2013.01); *H02J 17/00* (2013.01); *H02J 50/10* (2016.02); *H02J 50/40* (2016.02); *H02J 50/60* (2016.02)

(58) Field of Classification Search
USPC ...................................................... 320/108
See application file for complete search history.

(56) References Cited

U.S. PATENT DOCUMENTS 8,928,276 B2    1/2015   Kesler et al.
2003/0093187 A1*   5/2003   Walker .................... B64C 13/20
                                                               701/1

(Continued)

FOREIGN PATENT DOCUMENTS

CN        101154312 A    4/2008
CN        101449521 A    6/2009
(Continued)

OTHER PUBLICATIONS

U.S. Appl. No. 15/098,328, filed Apr. 14, 2016, Lee.
(Continued)

*Primary Examiner* — Mohammed Alam
(74) *Attorney, Agent, or Firm* — Wolf, Greenfield & Sacks, P.C.

(57) ABSTRACT

A method for performing wireless charging control of an electronic device and an associated apparatus are provided, where the method includes: determining at least one random value for controlling timing of packet transmission regarding at least one wireless charging report of the electronic device; and based on the aforementioned at least one random value, sending at least one random phase-delay packet, wherein each random phase-delay packet of the aforementioned at least one random phase-delay packet has a random phase-delay with respect to a time slot, and the aforementioned at least one random phase-delay packet is utilized for carrying information of the aforementioned at least one wireless charging report. More particularly, a wireless charging device (e.g. transmitter pad) is arranged to wirelessly charge the electronic device, and based on the aforementioned at least one random value, the electronic device does not obtain information from the wireless charging device through any packet.

7 Claims, 7 Drawing Sheets

Related U.S. Application Data

(60) Provisional application No. 61/928,093, filed on Jan. 16, 2014.

(51) Int. Cl.
*H02J 50/10* (2016.01)
*H02J 50/40* (2016.01)
*H02J 50/60* (2016.01)
*H02J 17/00* (2006.01)

(56) References Cited

U.S. PATENT DOCUMENTS

| | | | |
|---|---|---|---|
| 2012/0306284 A1* | 12/2012 | Lee | H02J 17/00 307/104 |
| 2012/0313445 A1 | 12/2012 | Park et al. | |
| 2012/0313448 A1 | 12/2012 | Anttila | |
| 2012/0329405 A1 | 12/2012 | Lee et al. | |
| 2013/0002038 A1 | 1/2013 | Lee et al. | |
| 2013/0094598 A1 | 4/2013 | Bastami | |
| 2014/0084822 A1 | 3/2014 | Ito et al. | |
| 2014/0176082 A1 | 6/2014 | Visser | |
| 2014/0184147 A1 | 7/2014 | Uchida | |
| 2014/0191568 A1* | 7/2014 | Partovi | H02J 7/025 307/9.1 |
| 2014/0191717 A1 | 7/2014 | Hong et al. | |
| 2014/0285145 A1 | 9/2014 | Patro et al. | |
| 2014/0298447 A1 | 10/2014 | Chu | |
| 2015/0194838 A1 | 7/2015 | Won et al. | |
| 2015/0198640 A1 | 7/2015 | Lee | |
| 2015/0201351 A1* | 7/2015 | Lee | H04L 1/1657 320/108 |
| 2016/0233715 A1* | 8/2016 | Lee | H02J 17/00 |
| 2016/0233728 A1 | 8/2016 | Park et al. | |
| 2018/0138733 A1* | 5/2018 | Lee | H02J 50/40 |

FOREIGN PATENT DOCUMENTS

| | | |
|---|---|---|
| CN | 102130477 A | 7/2011 |
| CN | 102224740 A | 10/2011 |
| CN | 102694423 A | 9/2012 |
| CN | 103370885 A | 10/2013 |
| CN | 103427499 A | 12/2013 |
| CN | 103457362 A | 12/2013 |
| CN | 104471833 A | 3/2015 |
| TW | 201401714 A | 1/2014 |
| WO | WO 02073901 A1 | 9/2002 |
| WO | WO 2013002437 A1 | 1/2013 |

OTHER PUBLICATIONS

Chinese Office Communication dated Aug. 3, 2016 for Application No. CN 201510023086.4.
Chinese Office Communication dated Sep. 19, 2016 for Application No. CN 201510019350.7.
Office Action dated Sep. 30, 2016 for U.S. Appl. No. 15/559,884.
Taiwanese Office Communication dated Oct. 22, 2015 for Application No. TW10421424470.
Office Action from Chinese Patent Application No. 201510023086.4 dated Aug. 3, 2016.
Office Action dated Sep. 19, 2016 from Chinese Application No. 201510019350.7.
Office Action dated Oct. 22, 2015 from corresponding Taiwan Patent Application No. TW10421424470.

* cited by examiner

METHOD FOR PERFORMING WIRELESS CHARGING CONTROL OF AN ELECTRONIC DEVICE WITH AID OF RANDOM PHASE-DELAY PACKET, AND ASSOCIATED APPARATUS

CROSS REFERENCE TO RELATED APPLICATIONS

This application is a divisional of U.S. application Ser. No. 14/307,501, entitled "METHOD FOR PERFORMING WIRELESS CHARGING CONTROL OF AN ELECTRONIC DEVICE WITH AID OF RANDOM PHASE-DELAY PACKET, AND ASSOCIATED APPARATUS, filed Jun. 18, 2014, which claims the benefit of U.S. Provisional Application No. 61/928,093, which was filed on Jan. 16, 2014, the entire contents of each of which is incorporated herein by reference.

BACKGROUND

The present invention relates to wirelessly charging multiple devices with the same wireless charging device, and more particularly, to a method for performing wireless charging control of an electronic device, and an associated apparatus.

According to the related art, a conventional wireless power transfer system may comprise a conventional transmitter pad that is arranged to charge multiple conventional electronic devices wirelessly. In order to accurately control the charging power, it is suggested in the related art to implement in-band or out-band communications between the conventional transmitter pad and the conventional electronic devices within the conventional wireless power transfer system. For in-band communications, bidirectional in-band communication using ISM band was restricted by FCC part 15/18. Even FCC agreed bidirectional in-band communication for pure wireless power control in late 2013, unidirectional in-band communication will still be preferred either for some other future regulation, simplicity or cost while comparing with bidirectional in-band communication. Adopting out-band bi-directional communication will be free from government regulation issues. However, some problems such as some side effects may occur. For example, in a situation where the aforementioned out-band communications is implemented with Bluetooth (BT) technologies, wireless communications components corresponding to the frequency band for BT should be added into the conventional transmitter pad and the conventional electronic devices, respectively, causing the related costs (e.g. material costs and labor costs) to be increased. In another example, as the number of devices using the same frequency band for BT in the place where the user stays (e.g. the office of the user) may increase significantly, the user (or somebody nearby) may suffer from insufficiency of the channels within the frequency band. Thus, a novel method is required to enhance the wireless charging control of an electronic device.

SUMMARY

It is an objective of the claimed invention to provide a method for performing wireless charging control of an electronic device, and an associated apparatus, in order to solve the above-mentioned problems.

According to at least one preferred embodiment, a method for performing wireless charging control of an electronic device is provided, where the method comprises the steps of: determining at least one random value for controlling timing of packet transmission regarding at least one wireless charging report of the electronic device; and based on the aforementioned at least one random value, sending at least one random phase-delay packet, wherein each random phase-delay packet of the aforementioned at least one random phase-delay packet has a random phase-delay with respect to a time slot, and the aforementioned at least one random phase-delay packet is utilized for carrying information of the aforementioned at least one wireless charging report. More particularly, a wireless charging device (e.g. a transmitter pad) is arranged to wirelessly charge the electronic device, and the step of sending the aforementioned at least one random phase-delay packet further comprises: based on the aforementioned at least one random value, sending the aforementioned at least one random phase-delay packet to the wireless charging device, without obtaining information from the wireless charging device through any packet.

According to at least one preferred embodiment, an apparatus for performing wireless charging control of an electronic device is provided, where the apparatus comprises at least one portion of the electronic device. The apparatus comprises a controller, and further comprises a communications module, which is coupled to the controller and a coil of the electronic device. The controller is arranged to determine at least one random value for controlling timing of packet transmission regarding at least one wireless charging report of the electronic device. In addition, the communications module is arranged to perform packet transmission for the controller by utilizing the coil. Additionally, based on the aforementioned at least one random value, the controller utilizes the communications module to send at least one random phase-delay packet, wherein each random phase-delay packet of the aforementioned at least one random phase-delay packet has a random phase-delay with respect to a time slot, and the aforementioned at least one random phase-delay packet is utilized for carrying information of the aforementioned at least one wireless charging report. More particularly, a wireless charging device (e.g. a transmitter pad) is arranged to wirelessly charge the electronic device, and based on the aforementioned at least one random value, the controller utilizes the communications module to send the aforementioned at least one random phase-delay packet to the wireless charging device, without obtaining information from the wireless charging device through any packet, performing a real unidirectional in-band communication capable of doing multiple devices power control in wireless charging system.

It is an advantage of the present invention that the present invention method and the associated apparatus can prevent, or greatly decrease the probability of, data collision of wireless charging report packets from multiple devices that are wirelessly charged at the same time. In addition, the present invention method and the associated apparatus can keep power control loops (e.g. the power control loops of the wireless power transfer system, which may comprise the wireless charging device and the electronic device) working by a simple one way communications control scheme, free from any dual way communications regulation, where power consumption can be reduced when the wireless charging device such as a transmitter pad is not transmitting any modulation signal. Additionally, the present invention method and the associated apparatus can prevent the related art problems (e.g. the problem of increased costs, and the problem of insufficiency of the channels within the frequency band).

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
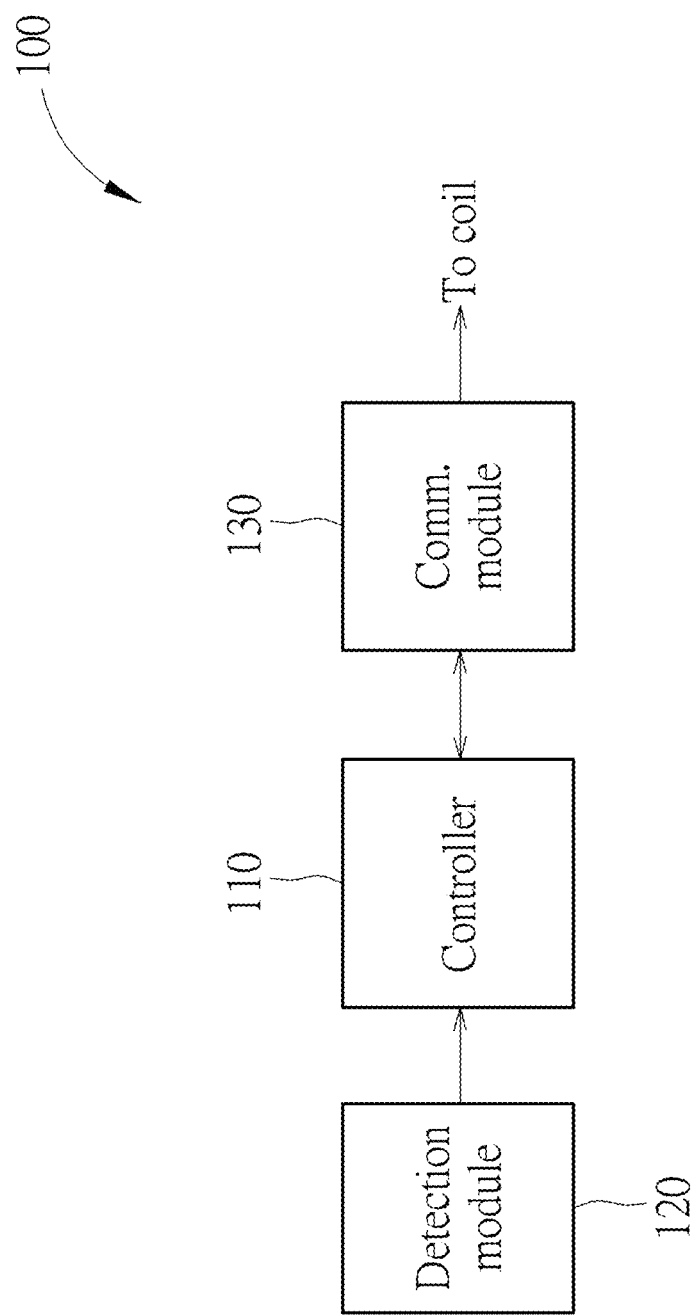
FIG. 1 is a diagram of an apparatus for performing wireless charging control of an electronic device according to a first embodiment of the present invention.

Please refer to FIG. 1, which illustrates a diagram of an apparatus 100 for performing wireless charging control of an electronic device according to a first embodiment of the present invention, where the apparatus 100 may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device and associated circuits thereof. In another example, the apparatus 100 can be the whole of the electronic device mentioned above. In another example, the apparatus 100 may comprise a system comprising the electronic device mentioned above (e.g. a wireless power transfer system comprising the electronic device). Examples of the electronic device may include, but not limited to, a mobile phone (e.g. a multifunctional mobile phone), a personal digital assistant (PDA), and a personal computer such as a laptop computer.

As shown in FIG. 1, the apparatus 100 may comprise a controller 110 (e.g. a microprocessor), a detection module 120, and a communications module 130 (labeled "Comm. module" in FIG. 1, for brevity), where the controller 110 is coupled to the detection module 120 and the communications module 130, and the communications module 130 can be coupled to a coil such as a power input coil (not shown in FIG. 1) of the electronic device. According to this embodiment, the controller 110 is arranged to perform wireless charging control. In addition, the detection module 120 is arranged to perform some detection operations (e.g. current detection operations and/or voltage detection operations) for the controller 110. Additionally, the communications module 130 is arranged to perform packet transmission for the controller 110 by utilizing the coil mentioned above, such as the aforementioned power input coil of the electronic device.

More particularly, the controller 110 may perform input power estimation in a situation where the electronic device is charged wirelessly, to generate information regarding the power that is received through wireless charging, for performing wireless charging control operations. Examples of the wireless charging control operations may include, but not limited to, increasing the charging power, decreasing the charging power, and performing foreign object detection (FOD). Regarding implementation details of the wireless charging technologies such as the aforementioned FOD, please refer to the Wireless Power Consortium (WPC) Qi V1.1 standard for more information.

Figure 2:
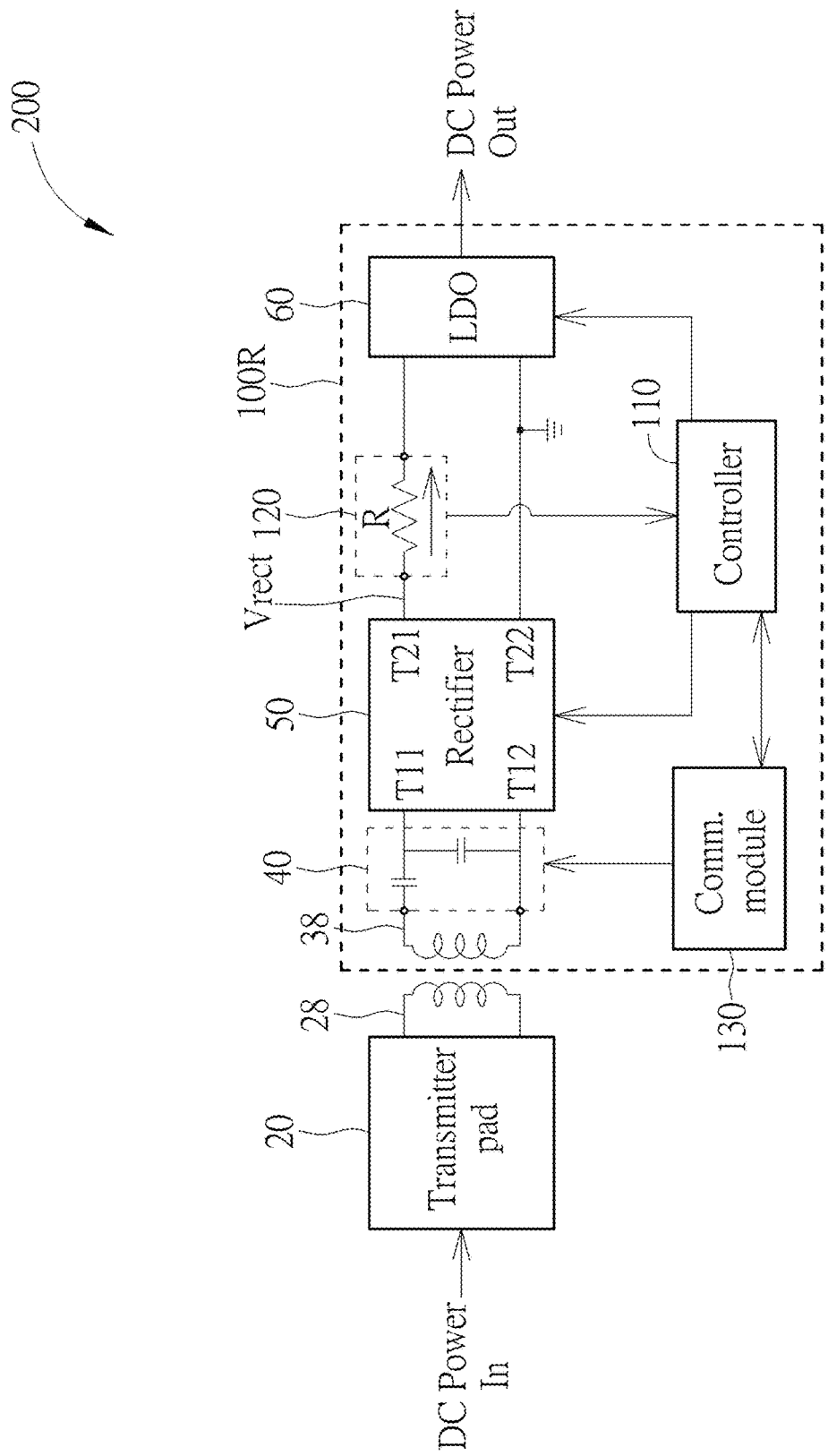
FIG. 2 is a diagram of a wireless power transfer system according to an embodiment of the present invention.

FIG. 2 is a diagram of a wireless power transfer system 200 according to an embodiment of the present invention, where the apparatus 100 may comprise at least one portion (e.g. a portion or all) of the wireless power transfer system 200. For example, the apparatus 100 may comprise a portion of the wireless power transfer system 200, and more particularly, can be a wireless charging receiver 100R (which can also be referred to as the receiver, for brevity) within the electronic device mentioned above, which means the apparatus 100 may comprise all components within the wireless charging receiver 100R shown in FIG. 2. In another example, the apparatus 100 may comprise a portion of the wireless power transfer system 200, and more particularly, can be the whole of the electronic device mentioned above, which means the apparatus 100 may comprise all components within the electronic device. In another example, the apparatus 100 can be the whole of the wireless power transfer system 200.

As shown in FIG. 2, in addition to the wireless charging receiver 100R, the wireless power transfer system 200 may further comprise a wireless charging device such as a transmitter pad 20 equipped with a power output coil 28. For better comprehension, the power output coil 28 can be illustrated outside the transmitter pad 20. This is for illustrative purposes only, and is not meant to be a limitation of the present invention. According to some variations of this embodiment, the power output coil 28 can be integrated into the transmitter pad 20. According to this embodiment, in addition to the controller 110, the detection module 120, and the communications module 130 mentioned above, the wireless charging receiver 100R may further comprise a power input coil 38, a matching circuit 40, a rectifier 50, and a low dropout (LDO) regulator 60 (labeled "LDO" in FIG. 2, for brevity), where the detection module 120 can be coupled to a specific stage of the wireless charging receiver 100R, and more particularly, can be coupled to the direct current (DC) output terminal T21 of the rectifier 50 of the electronic device, and the two alternating current (AC) input terminals T11 and T12 of the rectifier 50 are coupled to the two terminals of the power input coil 38 of the electronic device. In this embodiment, the terminal T22 of the rectifier 50 can be regarded as a ground terminal, and the two terminals T21 and T22 can be utilized for coupling the next stage such as the LDO regulator 60. More particularly, the rectifier 50 may obtain an AC input from the power input coil 38 through the two AC input terminals T11 and T12 of the rectifier 50, and rectifies the AC input to provide a DC output at the DC output terminal T21, such as a DC voltage level Vrect with respect to a ground voltage level at the terminal T22 (i.e. the ground terminal). For example, the AC input can be obtained from the power input coil 38 when the electronic device is wirelessly charged through the power input coil 38 by the transmitter pad 20.

In practice, the matching circuit 40 may comprise some impedance components such as some capacitors. In addition, the detection module 120 of this embodiment may comprise a current sensing resistor R, where one of the two terminals of the current sensing resistor R (e.g. the left terminal thereof in this embodiment) is coupled to the DC output terminal T21 of the rectifier 50, and another of the two terminals of the current sensing resistor R (e.g. the right terminal thereof in this embodiment) is coupled to a DC input terminal of the next stage of the rectifier 50, such as the upper left terminal of the LDO regulator 60 in this embodiment. For example, the detection module 120 may further comprise an analog-to-digital converter (ADC), which is integrated into the detection module 120 and is coupled to the current sensing resistor R of the detection module 120 in this embodiment. More particularly, the detection module 120 may detect at least one voltage difference (e.g. one or more voltage differences) between the two terminals of the current sensing resistor R, and may utilize the aforementioned ADC (not shown in FIG. 2) within the detection module 120 to perform analog-to-digital conversion on the aforementioned at least one voltage difference, in order to generate a digital output signal of the detection module 120, where the digital output signal of this embodiment may carry at least one digital value (e.g. one or more digital values) corresponding to the aforementioned at least one voltage difference, and is output to the controller 110. As the magnitude of the current passing through the current sensing resistor R can be derived from dividing the aforementioned at least one digital value (which can be regarded as the digital form of the aforementioned at least one voltage difference) by the resistance value of the current sensing resistor R, the digital output signal of the detection module 120 (more particularly, the aforementioned at least one digital value carried by the digital output signal) may indicate the current that is output through the DC output terminal T21 of the rectifier 50. As a result of some associated calculations, the controller 110 may perform power estimation of at least one portion (e.g. a portion or all) of the wireless charging receiver 100R, such as at least one stage (e.g. one or more stages) of the wireless charging receiver 100R.

Based on the architecture shown in FIG. 2, electric power may be transferred from the left side (e.g. the input labeled "DC Power In" in the leftmost of FIG. 2) to the right side (e.g. the input labeled "DC Power Out" in the rightmost of FIG. 2) stage by stage, where power loss may occur in some of the stages in this architecture. The controller 110 can estimate the received power of at least one portion (e.g. a portion or all) of the wireless charging receiver 100R, such as that of at least one stage (e.g. one or more stages) of the wireless charging receiver 100R, and can further send at least one wireless charging report (e.g. one or more wireless charging reports) such as at least one received power report (e.g. one or more estimated values) of the received power mentioned above to the transmitter pad 20 through related components (e.g. the communications module 130, the matching circuit 40, the power input coil 38, and the power output coil 28). As a result, wireless charging control can be performed properly in various situations.

According to this embodiment, the LDO regulator 60 can be utilized as the next stage of the rectifier 50. This is for illustrative purposes only, and is not meant to be a limitation of the present invention. According to some variations of this embodiment, the LDO regulator 60 can be omitted, and some circuits of the electronic device mentioned above may directly utilize the aforementioned DC output such as the DC voltage level Vrect mentioned above.

For better comprehension, the architecture shown in FIG. 2 can be illustrated with a scenario having the aforementioned electronic device wirelessly charged by the transmitter pad 20. This is for illustrative purposes only, and is not meant to be a limitation of the present invention. According to some variations of this embodiment, the architecture shown in FIG. 2 can be extended to illustrate some other scenarios having multiple copies (e.g. two copies, or more than two copies) of the aforementioned electronic device that are wirelessly charged by the transmitter pad 20 at the same time. Thus, in these variations, the wireless power transfer system 200 may comprise a plurality of copies of the wireless charging receiver 100R, such as the wireless charging receivers {100R} of the aforementioned multiple copies of the electronic device that are wirelessly charged by the transmitter pad 20 at the same time. For brevity, similar descriptions for these variations are not repeated in detail here.

Figure 3:
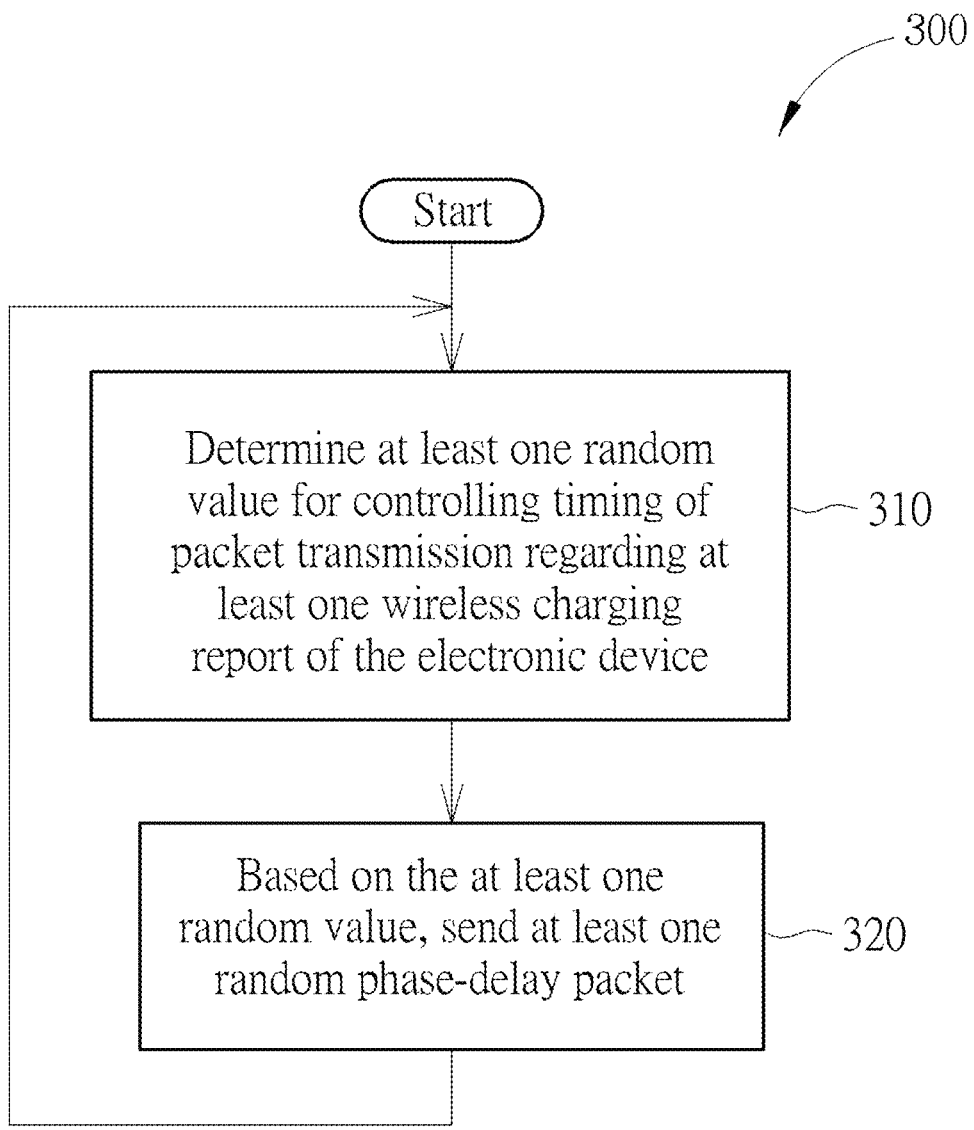
FIG. 3 illustrates a flowchart of a method for performing wireless charging control of an electronic device according to an embodiment of the present invention.

FIG. 3 illustrates a flowchart of a method 300 for performing wireless charging control of an electronic device according to an embodiment of the present invention. The method 300 shown in FIG. 3 can be applied to the apparatus 100 shown in FIG. 1 (more particularly, the wireless power transfer system 200 of the embodiment shown in FIG. 2), and can be applied to the controller 110 thereof. The method can be described as follows.

In Step 310, the controller 110 determines at least one random value (e.g. one or more random values) for controlling timing of packet transmission regarding at least one wireless charging report (e.g. one or more wireless charging reports) of the electronic device, such as the aforementioned at least one wireless charging report in the embodiment shown in FIG. 2. For example, in a situation where the aforementioned at least one random value represents a plurality of random values and the aforementioned at least one wireless charging report represents a plurality of wireless charging reports to be sent to the wireless charging device mentioned in the embodiment shown in FIG. 2 (e.g. the transmitter pad 20 in the wireless power transfer system 200) in a series of time slots, respectively, the plurality of random values may cause the timing of packet transmission in each of the series of time slots to be random.

In Step 320, based on the aforementioned at least one random value (more particularly, the aforementioned at least one random value that is just determined in Step 310), the controller 110 utilizes the communications module 130 to send at least one random phase-delay packet (e.g. one or more random phase-delay packets), where each random phase-delay packet of the aforementioned at least one random phase-delay packet has a random phase-delay with respect to a time slot (e.g. a corresponding time slot), and the aforementioned at least one random phase-delay packet is utilized for carrying information of the aforementioned at least one wireless charging report (more particularly, the aforementioned at least one wireless charging report in Step 310). For example, the phase-delay of the aforementioned each random phase-delay packet can be defined as the delay amount of the beginning of this random phase-delay packet, measured from the beginning of the corresponding time slot. This is for illustrative purposes only, and is not meant to be a limitation of the present invention. In another example, the phase-delay of the aforementioned each random phase-delay packet can be defined as the ratio of the delay amount of the beginning of this random phase-delay packet, measured from the beginning of the corresponding time slot, to the length of this time slot. In some other examples, the reference point for measuring the delay amount mentioned above in the corresponding time slot may vary.

No matter which of the above definitions of the phase-delay of the aforementioned each random phase-delay packet is applied, in a situation where the aforementioned at least one random value represents the plurality of random values mentioned above and the aforementioned at least one wireless charging report represents the plurality of wireless charging reports mentioned above, the aforementioned at least one random phase-delay packet may represent a plurality of random phase-delay packets transmitted in the series of time slots, respectively. In addition, based on the plurality of random values, the controller 110 utilizes the communications module 130 to send the plurality of random phase-delay packets, and controls the phase-delays of the plurality of random phase-delay packets in the series of time slots to be random, respectively. As a result, in the scenarios having the aforementioned multiple copies (e.g. two copies, or more than two copies) of the electronic device that are wirelessly charged by the transmitter pad 20 at the same time, the present invention method and the associated apparatus (e.g. the method 300 and the apparatus 100) can prevent, or greatly decrease the probability of, data collision of wireless charging report packets from multiple devices that are wirelessly charged at the same time, since data collision is typically known as the result of simultaneous data packet transmission between two or more devices.

Please note that the operation of Step 310 and the operation of Step 320 are illustrated in FIG. 3, respectively. This is for illustrative purposes only, and is not meant to be a limitation of the present invention. According to some variations of this embodiment, at least one portion (e.g. a portion or all) of the operation of Step 310 and at least one portion (e.g. a portion or all) of the operation of Step 320 can be performed at the same time.

According to this embodiment, based on the aforementioned at least one random value, the controller 110 utilizes the communications module 130 to send the aforementioned at least one random phase-delay packet (e.g. one or more random phase-delay packets) to the wireless charging device such as the transmitter pad 20, without obtaining information from the wireless charging device through any packet. For example, the wireless charging device does not send any packet to the electronic device, and the wireless charging device may simply receive the aforementioned at least one random phase-delay packet. Therefore, the present invention method and the associated apparatus (e.g. the method 300 and the apparatus 100) can keep power control loops of the wireless power transfer system 200 working by a simple one way communications control scheme, free from any dual way communications regulation, where power consumption can be reduced when the wireless charging device such as the transmitter pad 20 is not transmitting any modulation signal (e.g. the wireless charging). In comparison with the related art, the present invention method and the associated apparatus can guarantee the overall performance, and the related art problems (e.g. the problem of increased costs, and the problem of insufficiency of the channels within the frequency band) can be prevented.

In some embodiments of the present invention, based on the aforementioned at least one random value, the controller 110 utilizes the communications module 130 to send the aforementioned at least one random phase-delay packet (e.g. one or more random phase-delay packets) to the wireless charging device such as the transmitter pad 20, to trigger an associated wireless charging control operation of the wireless charging device, such as any of the wireless charging control operations mentioned above. More particularly, the wireless charging device may receive a specific random phase-delay packet within the aforementioned at least one random phase-delay packet (e.g. one of the plurality of random phase-delay packets) by detecting the specific random phase-delay packet in a packet detection window. For example, the length of the packet detection window can be equivalent to a predetermined value. This is for illustrative purposes only, and is not meant to be a limitation of the present invention. In another example, the ratio of the length of the packet detection window to the length of the time slot mentioned in Step 320 (e.g. the corresponding time slot) can be greater than or equal to one.

In another example, the wireless charging device such as the transmitter pad 20 is arranged to wirelessly charge the electronic device and another electronic device (e.g. a copy of the electronic device) at the same time. When it is detected that data collision exists in this packet detection window, the wireless charging device may immediately abort using this packet detection window and receive the next random phase-delay packet within the aforementioned at least one random phase-delay packet (e.g. another one of the plurality of random phase-delay packets) by detecting the next random phase-delay packet in the next packet detection window.

In another example, the wireless charging device such as the transmitter pad 20 is arranged to wirelessly charge the electronic device and another electronic device (e.g. a copy of the electronic device) at the same time. When it is detected that data collision exists in this packet detection window, the wireless charging device may discard information obtained from the specific random phase-delay packet mentioned above.

According to some embodiments of the present invention, a packet with random delay, such as any packet within the aforementioned at least one random phase-delay packet, can be sent per slot time by the electronic device, where the slot time mentioned above may represent the time interval of a time slot such as that mentioned above. For example, a packet detection window such as that mentioned above may have a size that is typically larger than or equal to twice the slot time, and can be set as a valid power control loop of the wireless power transfer system 200. This is for illustrative purposes only, and is not meant to be a limitation of the present invention. In another example, a packet detection window such as that mentioned above may have a size that is typically larger than or equal to the slot time, and can be set as a valid power control loop of the wireless power transfer system 200.

In practice, the wireless power transfer system 200 (more particularly, the transmitter pad 20) can determine a power control loop of the wireless power transfer system 200 to be valid when each packet of the packets (e.g. random phase-delay packets) sent from multiple devices that are wirelessly charged at the same time (e.g. the aforementioned multiple copies of the electronic device that are wirelessly charged by the transmitter pad 20 at the same time) can be correctly decoded. In addition, a proper power up amount (e.g. the increment of the wireless charging power) or a proper power down amount (e.g. the decrement of the wireless charging power) can be determined by the wireless power transfer system 200 (more particularly, the transmitter pad 20) through collected information obtained from these devices in a valid power control loop, such as the aforementioned power control loop that is determined to be valid.

Please note that, by checking whether any decoding error of the packets obtained in a power control loop such as that mentioned above exists, the wireless power transfer system 200 (more particularly, the transmitter pad 20) can determine whether data collision happens. For example, when a decoding error exists in this power control loop, the wireless power transfer system 200 (more particularly, the transmitter pad 20) determines that data collision happens. Once data collision happens in this power control loop, which can be known as an error decoding (or erroneous decoding), the wireless power transfer system 200 (more particularly, the transmitter pad 20) typically omits the prior information decoded in the same packet detection window and determines this power control loop to become invalid. For example, the power control action will be suspended for saving time, and the wireless charging device such as the transmitter pad 20 immediately aborts using this packet detection window as described above, and more particularly, skips this packet detection window immediately, for example. By generating a new packet detection window such as the next packet detection window mentioned above, the wireless power transfer system 200 (more particularly, the transmitter pad 20) may resume the associated wireless charging control operations and regain the power control action gain, while the next power control loop may be valid.

Figure 4:
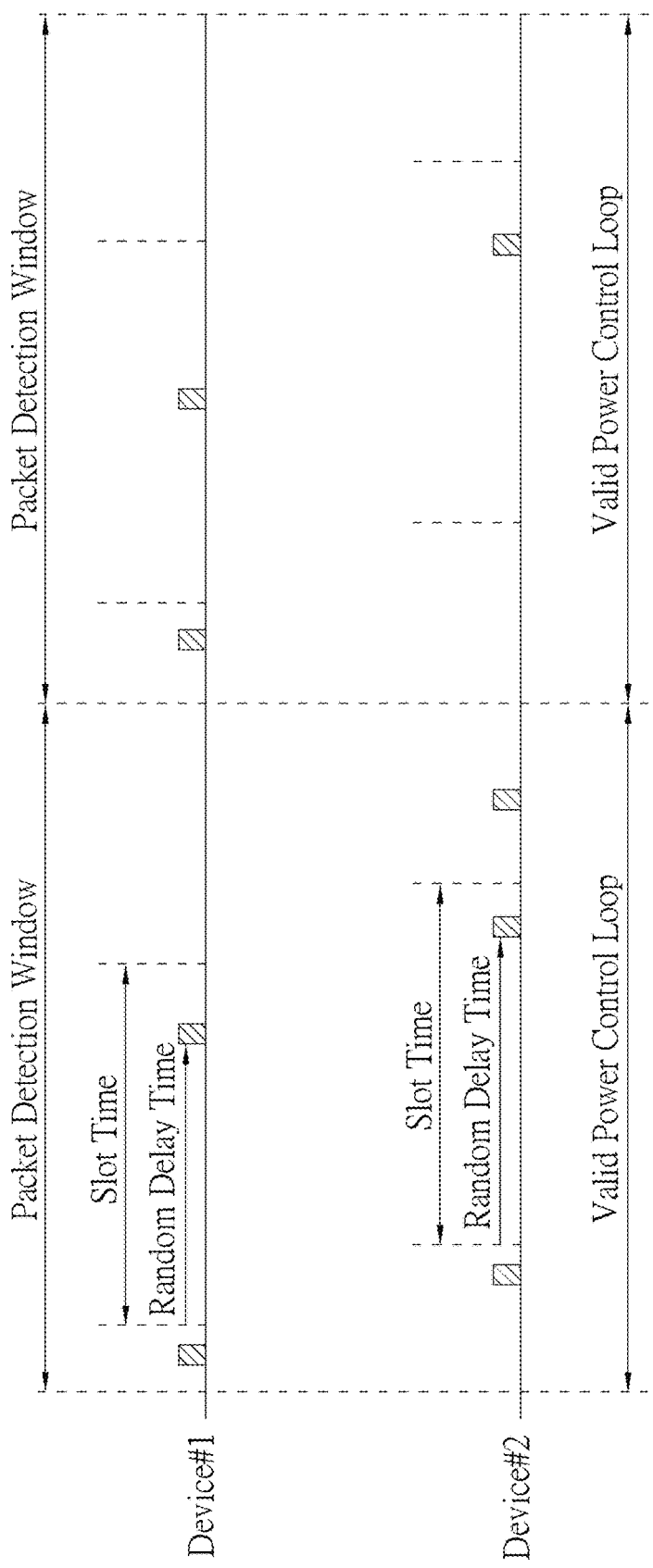
FIG. 4 illustrates a control scheme involved with the method shown in FIG. 3 according to an embodiment of the present invention.

FIG. 4 illustrates a control scheme involved with the method 300 shown in FIG. 3 according to an embodiment of the present invention, where the two devices Device#1 and Device#2 shown in FIG. 4, such as two copies of the aforementioned electronic device, are wirelessly charged by the transmitter pad 20 at the same time.

According to this embodiment, in a situation where the device Device#1 shown in FIG. 4 is taken as an example of the electronic device mentioned above, the first row of shaded blocks in the timing chart of the device Device#1 can be taken as an example of the plurality of random phase-delay packets mentioned above, and the associated series of time slots used by the device Device#1 can be continuous and periodical, where the period of these periodical time slots is labeled "Slot Time" in FIG. 4. For the device Device#1, the phase-delay of the aforementioned each random phase-delay packet can be defined as the delay amount of the beginning of this random phase-delay packet, measured from the beginning of the corresponding time slot, and can be labeled "Random Delay Time" in FIG. 4. In addition, in a situation where the device Device#2 shown in FIG. 4 is taken as an example of the electronic device mentioned above, the second row of shaded blocks in the timing chart of the device Device#2 can be taken as an example of the plurality of random phase-delay packets mentioned above, and the associated series of time slots used by the device Device#2 can be continuous and periodical, where the period of these periodical time slots is labeled "Slot Time" in FIG. 4. For the device Device#2, the phase-delay of the aforementioned each random phase-delay packet can be defined as the delay amount of the beginning of this random phase-delay packet, measured from the beginning of the corresponding time slot, and can be labeled "Random Delay Time" in FIG. 4. As shown in FIG. 4, a packet detection window may be equal to double slot time (i.e. twice the slot time), and will be regarded as a valid power control loop when each packet in this packet detection window is decoded correctly. For brevity, similar descriptions for this embodiment are not repeated in detail here.

Figure 5:
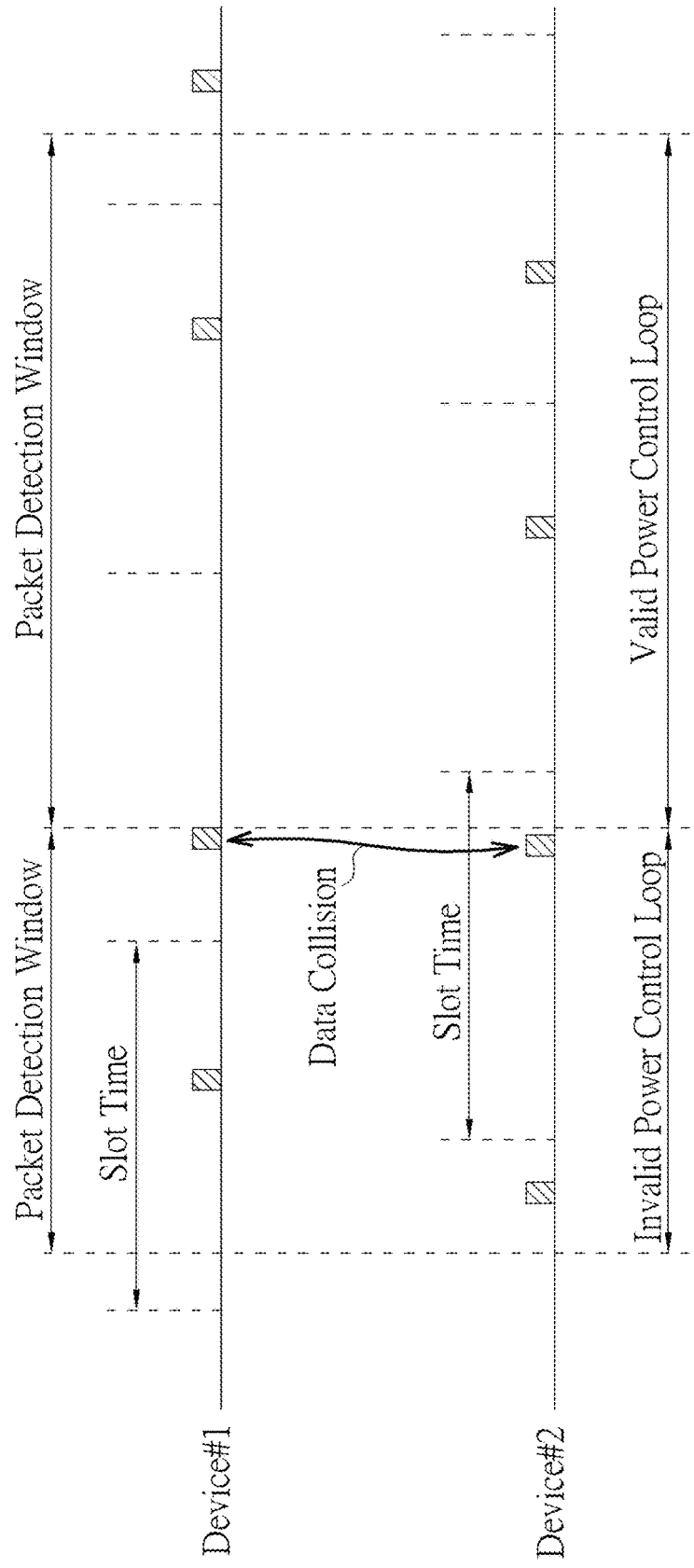
FIG. 5 illustrates a control scheme involved with the method shown in FIG. 3 according to another embodiment of the present invention.

FIG. 5 illustrates a control scheme involved with the method 300 shown in FIG. 3 according to another embodiment of the present invention, where the two devices Device#1 and Device#2 shown in FIG. 5, such as two copies of the aforementioned electronic device, are wirelessly charged by the transmitter pad 20 at the same time.

According to this embodiment, in a situation where the device Device#1 shown in FIG. 5 is taken as an example of the electronic device mentioned above, the first row of shaded blocks in the timing chart of the device Device#1 can be taken as an example of the plurality of random phase-delay packets mentioned above, and the associated series of time slots used by the device Device#1 can be continuous and periodical, where the period of these periodical time slots is labeled "Slot Time" in FIG. 5. For the device Device#1, the phase-delay of the aforementioned each random phase-delay packet can be defined as the delay amount of the beginning of this random phase-delay packet, measured from the beginning of the corresponding time slot, and can be labeled "Random Delay Time" in FIG. 5. In addition, in a situation where the device Device#2 shown in FIG. 5 is taken as an example of the electronic device mentioned above, the second row of shaded blocks in the timing chart of the device Device#2 can be taken as an example of the plurality of random phase-delay packets mentioned above, and the associated series of time slots used by the device Device#2 can be continuous and periodical, where the period of these periodical time slots is labeled "Slot Time" in FIG. 5. For the device Device#2, the phase-delay of the aforementioned each random phase-delay packet can be defined as the delay amount of the beginning of this random phase-delay packet, measured from the beginning of the corresponding time slot, and can be labeled "Random Delay Time" in FIG. 5. As shown in FIG. 5, once data collision in a power control loop happens, triggering a decoding error corresponding to this power control loop, the prior information decoded in the same packet detection window will be omitted and this power control loop will become invalid. In practice, the power control action will be suspended until a subsequent power control loop such as the next power control loop is determined to be valid, while at least one new packet detection window (e.g. one or more new packet detection windows) may be generated. For brevity, similar descriptions for this embodiment are not repeated in detail here.

According to an embodiment, such as a variation of the embodiment shown in FIG. 5, as the power control loop under consideration may switch from the original power control loop (e.g. the power control loop shown around the leftmost of FIG. 5) to the aforementioned subsequent power control loop such as the next power control loop (e.g. the power control loop shown around rightmost of FIG. 5), the power control action can be suspended until the power control loop under consideration becomes valid. For brevity, similar descriptions for this embodiment are not repeated in detail here.

Figure 6:
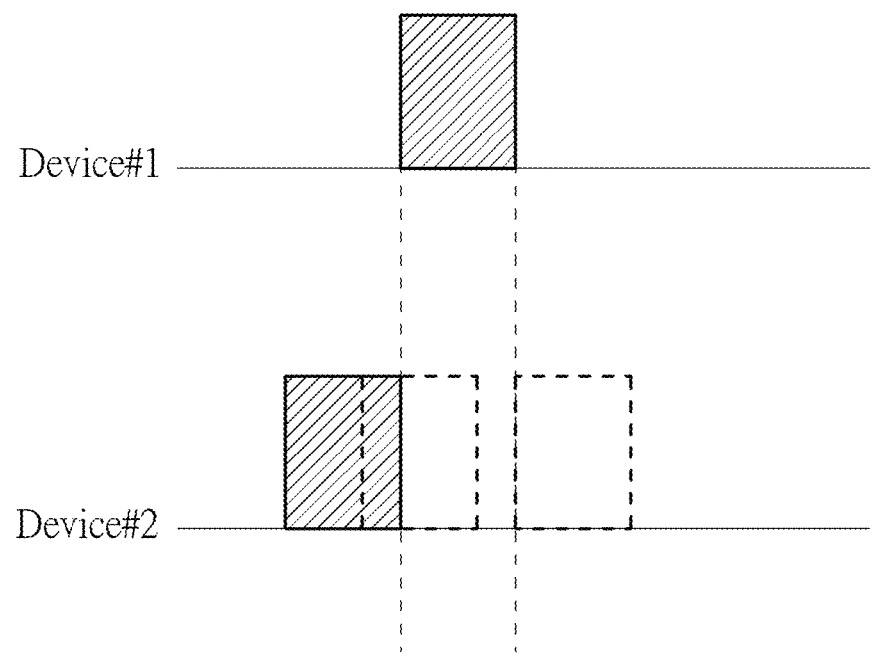
FIG. 6 illustrates a scenario of two devices involved with the method shown in FIG. 3 according to an embodiment of the present invention.

FIG. 6 illustrates a scenario of two devices involved with the method 300 shown in FIG. 3 according to an embodiment of the present invention, where the two devices Device#1 and Device#2 shown in FIG. 6, such as two copies of the aforementioned electronic device, are wirelessly charged by the transmitter pad 20 at the same time.

According to this embodiment, the probability of data collision between two packets of the two devices Device#1 and Device#2, such as a random phase-delay packet from the device Device#1 and a random phase-delay packet from the device Device#2, may be calculated as follows. Suppose that the length of each of the aforementioned two packets of the two devices Device#1 and Device#2 on the time axis is equal to 10 milliseconds (ms), and that the aforementioned slot time such as the period of the series of time slots is equal to 100 ms. In a situation where the random delay unit is equal to 1 ms, the data collision probability $P_{DATA\ COLLISION}$ (Device#1, Device#2) of the two devices Device#1 and Device#2 in a single slot time can be expressed as follows:

$$P_{DATA\ COLLISION}(Device\#1, Device\#2) = (20/100) = 0.2;$$

where some assumptions may be applied. This is for illustrative purposes only, and is not meant to be a limitation of the present invention. In some other examples, at least one portion (e.g. a portion or all) of the length of each of the aforementioned two packets of the two devices Device#1 and Device#2 on the time axis, the aforementioned slot time such as the period of the series of time slots, and the random delay unit (e.g. the length of the random phase-delay packet from the device Device#1, the length of the random phase-delay packet from the device Device#2, the aforementioned slot time such as the period of the series of time slots, and/or the random delay unit) may be varied.

For better comprehension, regarding the above calculation, the random phase-delay packet from the device Device#1 can be illustrated to be located at a random time point on the timing chart of the device Device#1, and the location of the random phase-delay packet from the device Device#2 on the timing chart of the device Device#2 can be illustrated to be variable, from one random time point to another random time point on the timing chart of the device Device#2, in different situations. This is for illustrative purposes only, and is not meant to be a limitation of the present invention. According to a variation of this embodiment, the random phase-delay packet from the device Device#2 can be illustrated to be located at a random time point on the timing chart of the device Device#2, and the location of the random phase-delay packet from the device Device#1 on the timing chart of the device Device#1 can be illustrated to be variable, from one random time point to another random time point on the timing chart of the device Device#1, in different situations.

Figure 7:
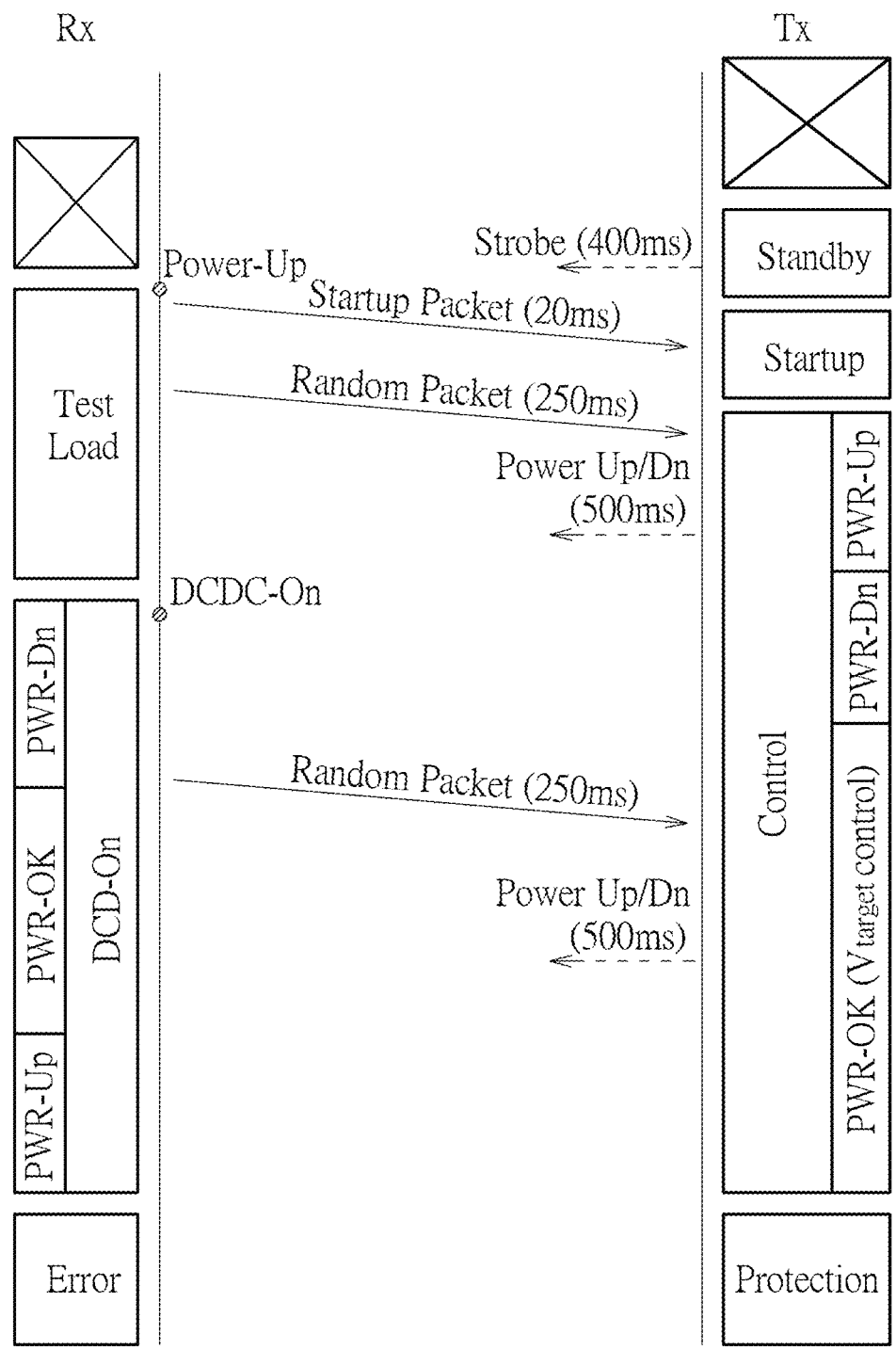
FIG. 7 illustrates a control scheme involved with the method shown in FIG. 3 according to an embodiment of the present invention.

FIG. 7 illustrates a control scheme involved with the method 300 shown in FIG. 3 according to an embodiment of the present invention, where the notation Tx may represent a transmitter in the wireless power transfer system 200, such as the aforementioned wireless charging device (e.g. the transmitter pad 20), and the notation Rx may represent a receiver in the wireless power transfer system 200, such as the electronic device mentioned above.

According to this embodiment, the arrows illustrated with dashed lines, such as those labeled "Strobe", "Power Up/Dn" (which means "Power Up" or "Power Dn"), etc. can be regarded as signals of the power control action mentioned above, and each of the strobe signal Strobe, the power up signal "Power Up", and the power down signal "Power Dn" does not comprise any packet, and is not involved with packet transmission. For example, the length of the strobe signal Strobe of this embodiment may be equal to 400 ms, and the length of any of the power up signal "Power Up" and the power down signal "Power Dn" in this embodiment may be equal to 500 ms. In addition, the arrows illustrated with non-dashed lines, such as those labeled "Startup Packet", "Random Packet", etc. can be regarded as the packets sent from the receiver Rx, where the startup packet can be utilized for notifying the transmitter Tx of the startup of the receiver Rx, and the random packets can be regarded as an example of the plurality of random phase-delay packets mentioned above. For example, the length of the startup packet of this embodiment may be equal to 20 ms, and the length of any of the random packets in this embodiment may be equal to 250 ms.

As shown in FIG. 7, the strobe signal Strobe may trigger the receiver Rx to enter the power up status (e.g. the circle labeled "Power-Up" in FIG. 7, for brevity), and the receiver Rx turns on the main power for the controller 110 to allow the controller 110 to perform wireless charging control, and starts the wireless charging control phase "Test Load" for testing the load coupled to the wireless charging receiver 100R within the receiver Rx. Afterward, the receiver Rx may enter the DC-DC on status (e.g. the circle labeled "DCDC-On" in FIG. 7, for brevity) and start the wireless charging control phase "DCDC-On" shown around the lower left of FIG. 7 to perform associated operations regarding wireless charging control, where different conditions such as the power down condition PWR-Dn, the power OK condition PWR-OK, and the power up condition PWR-Up may be encountered by the receiver Rx. In addition, as shown around the upper right of FIG. 7, the transmitter Tx may initially stay in a standby status. Afterward, when receiving the startup packet from the receiver Rx, the transmitter Tx may enter the wireless charging control phase "Startup" shown around the upper right of FIG. 7 to perform initialization. Then, the transmitter Tx may enter the wireless charging control phase "Control" shown around the lower right of FIG. 7 to perform associated operations regarding wireless charging control, where different conditions such as the power up condition PWR-Up, the power down condition PWR-Dn, and the power OK condition PWR-OK may be encountered by the transmitter Tx, and the latter may be associated with target voltage control (labeled "$V_{target}$ control" in FIG. 7, for brevity). For example, the receiver Rx may detect an error and enter the wireless charging control phase "Error", and the transmitter Tx may enter the wireless charging control phase "Protection" to perform an associated protection operation. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for wirelessly charging a plurality of electronic devices, the apparatus comprising:
   a power output transmitter for wirelessly transferring wireless power to the plurality of electronic devices; and
   circuitry configured to:
   receive wireless charging reports from respective electronic devices of the plurality of electronic devices, the wireless charging reports comprising charging status information based on wireless power received by the respective electronic devices; and in response to receiving at least one of the wireless charging reports, triggering associated wireless charging control operation, wherein when the circuitry detects that data collision exists between two or more of the wireless charging reports in a packet detection window, the circuitry is configured to shorten a duration of the packet detection window and receive a next wireless charging report by detecting the next wireless charging report in a subsequent packet detection window.

2. The apparatus of claim 1, wherein the associated wireless charging control operation comprises a variation in the transferred wireless power.

3. The apparatus of claim 1, wherein the power output transmitter comprises a power output coil.

4. The apparatus of claim 1, wherein a length of the packet detection window is equivalent to a predetermined value.

5. A method for wirelessly charging a plurality of electronic devices, the method comprising:

wirelessly transferring wireless power to the plurality of electronic devices with a power output transmitter;

receiving wireless charging reports from respective electronic devices of the plurality of electronic devices, the wireless charging reports comprising charging status information based on the wireless power received by the respective electronic devices; and in response to receiving at least one of the wireless charging reports, triggering an associated wireless charging control operation; and when it is detected that data collision exists between two or more of the wireless charging reports in a packet detection window, shortening a duration of the packet detection window and receiving a next wireless charging report by detecting the next wireless charging report in a subsequent packet detection window.

6. The method of claim 5, wherein triggering the associated wireless charging control operation comprises causing a variation in the transferred wireless power.

7. The method of claim 5, wherein a length of the packet detection window is equivalent to a predetermined value.

* * * * *